(12) United States Patent
Weatherly et al.

(10) Patent No.: US 8,141,574 B2
(45) Date of Patent: Mar. 27, 2012

(54) THERMALLY ACTIVATED PRESSURE RELIEF

(75) Inventors: Haldon L. Weatherly, Lincoln, CA (US); Jason M. Burns, Riverside, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 896 days.

(21) Appl. No.: 12/156,272

(22) Filed: May 29, 2008

(65) Prior Publication Data
US 2009/0293958 A1 Dec. 3, 2009

(51) Int. Cl.
*F16K 17/38* (2006.01)

(52) U.S. Cl. ............ 137/72; 137/79; 251/1.2; 220/89.4

(58) Field of Classification Search .................. 137/68.3, 137/72, 74, 79, 80; 251/1.2, 11, 324; 220/89.4; 169/57; 236/92 C; *F16K 17/14*
See application file for complete search history.

(56) References Cited

U.S. PATENT DOCUMENTS

| | | | | |
|---|---|---|---|---|
| 4,221,231 A | * | 9/1980 | Harvey et al. | 137/72 |
| 4,503,675 A | * | 3/1985 | Gardner et al. | 60/527 |
| 4,553,589 A | * | 11/1985 | Jennings et al. | 166/53 |
| 5,161,738 A | | 11/1992 | Wass | |
| 5,275,194 A | * | 1/1994 | Gray, Jr. | 137/75 |
| 5,495,865 A | | 3/1996 | Wass | |
| 5,632,297 A | | 5/1997 | Sciullo | |

FOREIGN PATENT DOCUMENTS

JP 2005-076862 3/2005

* cited by examiner

*Primary Examiner* — Craig Schneider
*Assistant Examiner* — Ian Paquette
(74) *Attorney, Agent, or Firm* — Heisler & Associates

(57) ABSTRACT

The housing is attachable to a high pressure fluid containing structure. A piston is provided within the housing, with the piston having a closed position and an open position. The closed position blocks an outlet vent of the relief device, with the open position allowing high pressure fluid to escape through the vent. The piston is biased toward the open position by the high pressure fluid, but is held in the closed position by a slide. The slide has a first position and a second position, with the first position holding the piston in the closed position. A spring biases the slide toward a second position, with a eutectic mass resisting movement of the slide to the second position. The eutectic mass is selected to have a melting point matching a maximum design temperature for the high pressure fluid containing structure. Should the eutectic mass melt, the high pressure fluid escapes.

15 Claims, 2 Drawing Sheets

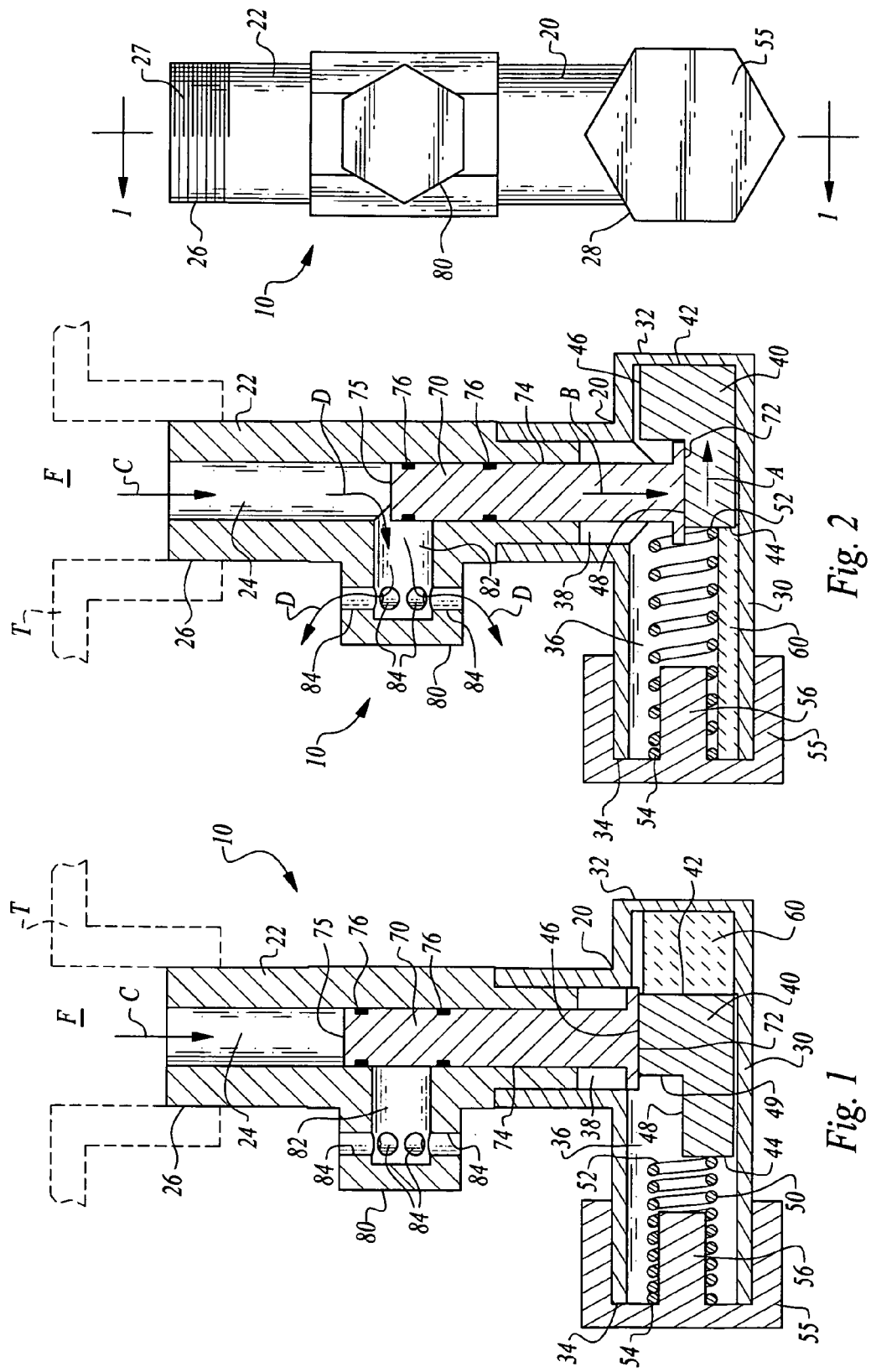

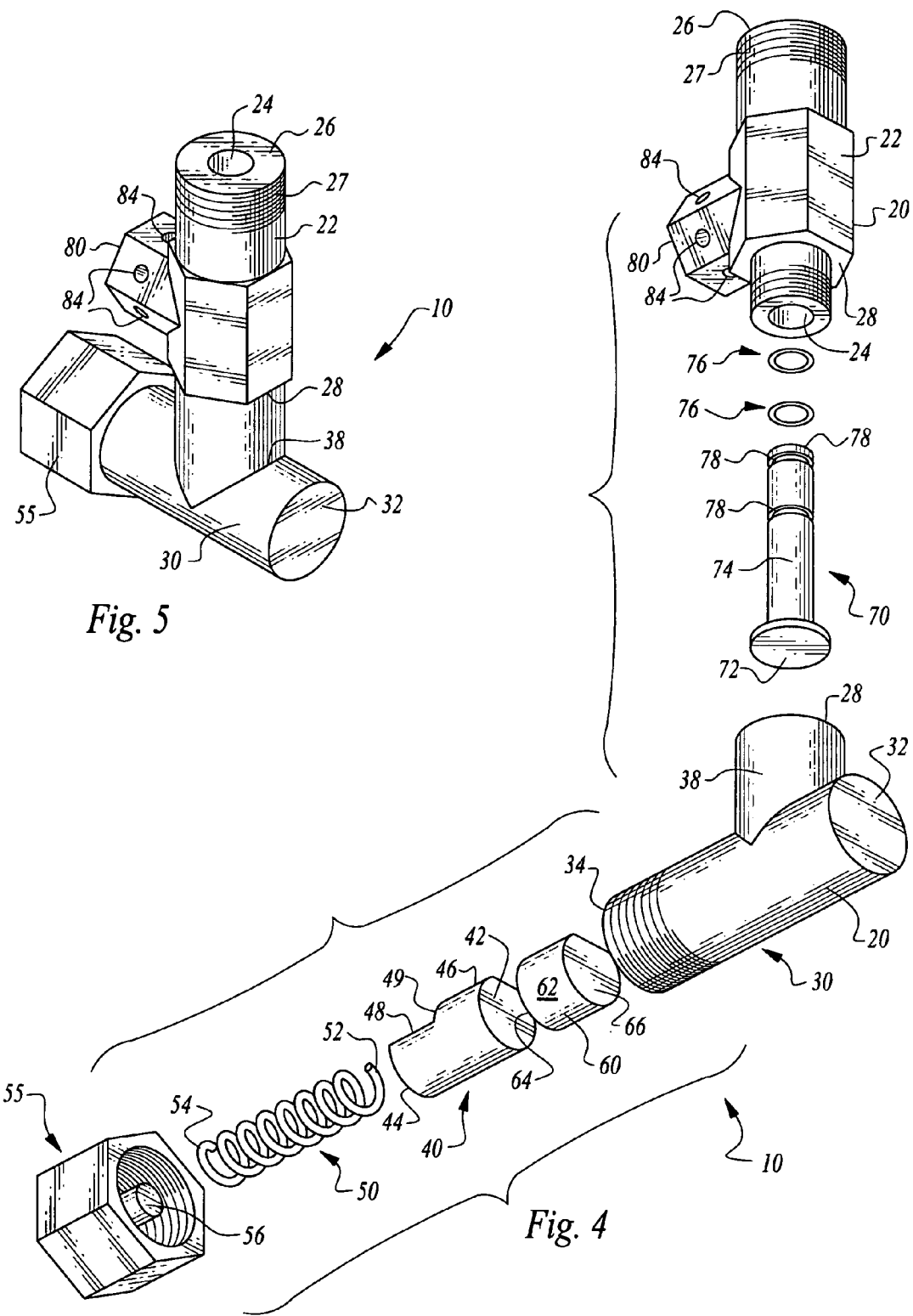

THERMALLY ACTIVATED PRESSURE RELIEF

GOVERNMENT LICENSE RIGHTS

The U.S. Government has a paid-up license in this invention and the right in limited circumstances to require the patent owner to license others on reasonable terms as provided for by the terms of Contract No. W81XWH-07-1-0127 awarded by the U.S. Army.

FIELD OF THE INVENTION

The following invention relates to pressure relief valves and pressure relief devices for relieving pressure from high pressure liquid and gas containing structures. More particularly, this invention relates to high pressure fluid relief devices which are thermally activated to open and relieve pressure from the high pressure fluid containing structure when an off design elevated temperature is experienced, such as during a fire.

BACKGROUND OF THE INVENTION

Materials that are gaseous at standard temperature and pressure are often contained for storage and/or transport within pressure vessels. Such pressure vessels allow a large mass quantity of the gas to be stored/transported in a relatively small space. Upon compression of the gas, some gases will typically transition to a liquid. At least a portion of the container will typically still contain gaseous vapors even when a majority of the material is in a liquid state within the container. Together the gaseous vapors and/or fluids are referred to herein as "high pressure fluid."

Pressure vessels must be carefully designed and carefully manufactured to avoid rupture and the associated potential for explosion or other hazards associated with reaction forces acting on portions of the tank and/or the potential for fire and wide distribution of potentially hazardous gas into a surrounding environment. Such design for the pressure vessels includes selection of appropriate materials for handling the fluid under pressure, and also selecting proper manufacturing techniques for the vessels. Furthermore, any valves, sensors or other equipment coupled to the vessel must similarly be carefully designed and manufactured so that the vessel can safely and effectively contain the fluid at high pressure and monitor conditions within the vessel.

Typically the design and manufacture of pressure vessels involves a large safety factor so that the pressure vessel can actually contain the fluid at significantly higher pressures than the pressure of the gas actually stored, or transported within the vessel. For instance, a pressure vessel designed to contain fluid at 3,000 psi might in fact be able to contain the fluid at up to 6,000 psi before a rupture would occur, providing a safety factor of two. Often actual safety factors of three or more are specified by regulatory authorities.

One condition which can cause a pressure vessel to exceed its design pressure is when excessive heat, such as that associated with a fire, is experienced by the pressure vessel. When a gas (in its gaseous phase) undergoes heating, its pressure increases, with pressure being proportional with temperature when held at constant volume, such as within a pressure vessel, according to the ideal gas law. If sufficient heating occurs, the design pressure and the margin of safety can both be exceeded, leading to potential explosive rupture of the tank. Vessels often include a "burst diaphragm" which is designed to fail at a pressure slightly less than the maximum pressure the vessel can contain. Thus, if the pressure approaches the maximum pressure the burst diaphragm will burst in a more controlled fashion and relieve pressure before the vessel explodes.

Burst diaphragms are not entirely reliable when the vessel is undergoing heating, such as in a fire. Typically, when a high heat source such as a fire is acting on the pressure vessel, other damage may have occurred to the pressure vessel weakening the pressure vessel somewhat, and the temperature itself has a direct affect on the strength of the pressure vessel, potentially weakening the materials forming the pressure vessel. If the vessel's strength is reduced to below the strength of the burst diaphragm, uncontrolled explosive rupture may occur.

Experience has shown that it is best to allow fluids contained within a pressure vessel to bleed off in a somewhat controlled fashion rather than to allow pressure to build up within a pressure vessel to the point where an explosive rupture might occur. Furthermore, experience has shown that when high temperature is acting on a pressure vessel, a pressure based relief valve or burst diaphragm alone is often not sufficient.

Often pressure vessels do not include a readily available power source and operate in environments where it is undesirable to utilize powered temperature sensors, such as a thermal couple acting on a solenoid driven pressure relief valve. Also, in a fire such power sources typically fail. Thus, it is desirable to provide simple solid state relief devices of a purely mechanical nature, and which reliably remain closed except when a high temperature is experienced above a threshold temperature, to open the relief device when such a high temperature is reached and to relieve pressure from the pressure vessel. One known way to provide such temperature activated devices is to utilize a eutectic material that has a melting point at the threshold temperature desired for the tank. This eutectic material is placed within a vent circuit. When a temperature above the melting point for this eutectic material is reached, the eutectic material melts and fluid is allowed to escape out of the vent. Such systems are common with fire sprinklers plumbed into buildings.

While such pressure relief devices are generally effective, eutectic materials do not handle exposure directly or indirectly to high pressure particularly well. In particular, commonly available eutectic materials are subject to a relatively high degree of creep when loaded under high pressure. This creep over time can cause a pressure vessel to be vented even though no high temperature has been experienced. While such pressure relief devices can merely be replaced on a regular basis, this creates a burden for the pressure vessel operator. Accordingly, a need exists for a thermally activated pressure relief device which is not subject to the disadvantage of creep acting on a eutectic material anywhere within the pressure relief device, but which still can operate in a variety of different environments without requiring a power supply, sensors, scheduled maintenance or complex electrical or mechanical components.

SUMMARY OF THE INVENTION

With this invention a pressure relief device is provided suitable for attachment to a pressure vessel or other high pressure fluid containing structure to vent high pressure fluid from the structure when a threshold temperature is experienced. The device includes a housing securely coupled to the high pressure fluid containing structure. The housing includes at least two moving structures therein: a piston and a movable piston holder, preferably in the form of a slide. The piston is interposed between the slide and the high pressure fluid so that the piston is biased toward the slide by pressure force acting on the piston.

The slide itself can translate in a direction non-parallel with the piston and is biased toward a second position by a compression spring, but held in a first position by a eutectic mass trapped between the slide a side of the housing. The eutectic mass resists a force of the spring while the slide resists a force of the piston due to pressure of the high pressure fluid acting on the piston. Hence, the high pressure fluid does not act directly or indirectly on the eutectic mass through the piston, but rather translates loads associated with the high pressure fluid to the housing. The eutectic mass only experiences loads from the spring.

The slide includes a side against which a head of the piston abuts. This side of the slide includes a plane and a step which are preferably parallel with each other but spaced different distances from the piston when in its original closed position. The piston abuts the plane when in the closed position, but when the slide moves under force from the spring the step of the slide is aligned with the head of the piston and the piston translates within the housing to place the head of the piston against the step. Such movement of the slide can only occur after the eutectic mass has melted due to the threshold temperature for the pressure relief device being exceeded.

When the piston translates to move the head against the step, the piston moves sufficiently far to open a pathway between the high pressure fluid and a vent on a side of the cylindrical bore in which the piston resides. Once the piston has moved from the closed position to the open position, high pressure fluid from the high pressure fluid containing structure can pass through the vent and into the surrounding atmosphere in a safe and controlled manner, rather than the high pressure fluid containing structure potentially rupturing in an uncontrolled fashion.

OBJECTS OF THE INVENTION

Accordingly, a primary object of the present invention is to provide a relief device for relieving pressure from a pressure vessel when an unacceptably high temperature is experienced.

Another object of the present invention is to provide a thermally activated pressure relief device which is configured to operate over long periods of time without susceptibility to creep for the materials contained within the relief device.

Another object of the present invention is to provide a thermally activated pressure relief device which avoids the need for temperature sensors and/or pressure sensors.

Another object of the present invention is to provide a thermally activated pressure relief device which operates in a reliable fashion over a long period of time without requiring maintenance thereto.

Another object of the present invention is to provide a relief device for relieving pressure from a pressure vessel in a controlled fashion when dangerously high temperatures are experienced.

Other further objects of the present invention will become apparent from a careful reading of the included drawing figures, the claims and detailed description of the invention.

BRIEF DESCRIPTION OF THE DRAWINGS

FIG. 1 is a full sectional view of the pressure relief device of this invention with a piston thereof in a closed position.

FIG. 2 is a full sectional view similar to that which is shown in FIG. 1 but with the piston moved to an open position and with high pressure fluid being vented from a tank to which the pressure relief device is attached.

FIG. 3 is an end elevation view of that which is shown in FIGS. 1 and 2.

FIG. 4 is an exploded parts view of the relief device of this invention.

FIG. 5 is a perspective view of the relief device of this invention.

DESCRIPTION OF THE PREFERRED EMBODIMENT

Referring to the drawings, wherein like reference numerals represent like parts throughout the various drawing figures, reference numeral 10 is directed to a preferred embodiment of a relief device for relieving pressure within a pressure containing structure, such as a tank T (FIGS. 1 and 2) when a preselected maximum temperature is exceeded. The relief device 10 keeps high pressure fluid F within the tank T unless the threshold temperature is exceeded, in which case the relief device 10 allows the fluid F to be vented through the relief device 10 in a controlled fashion. In this way, high pressure fluid F is vented from the tank T before the tank T or other high pressure fluid containing structure can experience an uncontrolled rupture.

In essence, and with particular reference to FIGS. 1 and 5, basic details of the relief device 10 are described according to a preferred embodiment. The relief device 10 includes a housing 20 containing the various portions of the relief device 10. The housing 20 includes a first leg 22 which is adapted to securely attach to a tank T or other high pressure fluid F containing structure. The housing 20 also includes a second leg 30 joined to the first leg 22 but extending in a direction distinct from a direction of extension of the first leg 22. A slide 40 is located within a hollow chamber 36 located within the second leg 30 of the housing 20. This slide 40 has a spring 50 on one side of the slide 40, held in place by a cap 55. A eutectic mass 60 is located on a side of the slide 40 opposite the spring 50, with the eutectic mass 60 trapped between the slide 40 and a closed end 32 of the second leg 30 of the housing 20.

A piston 70 is located within a central bore 24 in the first leg 22 of the housing 20. The piston 70 has a head 72 abutting the slide 40 and a foot 75 exposed to the high pressure fluid F within the tank T or other high pressure fluid F containing structure. A vent 80 is formed on the first leg 22 of the housing 20 at a location which is blocked by the piston 70 when in a first closed position, but which is placed into fluid communication with the high pressure fluid F when the piston 70 moves to an open position, facilitated by movement of the slide 40. The eutectic mass 60 is designed to have a low melting temperature matching the preselected pressure relief temperature for the relief device 10. When this temperature is reached, the eutectic mass 60 melts, allowing the slide 40 to move under force provided by the spring 50, and allowing the piston 70 to move from the closed position to the open position for the piston 70.

More specifically, and with particular reference to FIGS. 1 and 4, details of the housing 20 are described according to the preferred embodiment. The housing 20 is a rigid generally hollow structure formed of materials compatible with the fluid F contained within the tank T or other high pressure fluid F containing structure. The housing 20 typically has walls sufficiently thick to handle the same pressure that is held by the tank T. The housing 20 is most preferably formed in two separate parts to facilitate manufacture and assembly. The housing 20 generally includes two legs including a first leg 22 and a second leg 30. These two legs 22, 30 are preferably substantially perpendicular to each other with the first leg 22 adapted to be coupled to the tank T at a fitting hole thereon and the second leg 30 coupled to an end of the first leg 22 opposite the tank T.

The first leg 22 of the housing 20 includes a hollow central bore 24 extending along a central axis of the housing 20. This central bore 24 extends from an attached end 26 to a joint 28 where the first leg 22 joins to the second end 30. This central bore 24 is open to the chamber 36 within the second leg 30, described in more detail below. The central bore 24 is preferably circular in uniform cross-section from end to end so that the central bore 24 is generally cylindrical in form. The attached end 26 of the first leg 22 preferably includes threads 27 thereon to facilitate attachment to the tank T, such as by threading the first leg 22 of the housing 20 into the fitting on the tank T to secure the first leg 22 of the housing 20 to the tank T. The joint 28 defines a transition between the two portions forming the housing 20, including the first leg 22 and the second leg 30. This joint 28 is also preferably in the form of a threaded joint for threadably joining the second leg 30 to the first leg 22.

The second leg 30 is a rigid hollow structure containing the chamber 36 therein. The second leg 30 is preferably formed of a similar material with the first leg 22 and with similar design criteria, including the ability to withstand pressure similar to that generated by the fluid F within the tank T. The second leg 30 includes a closed end 32 at one end thereof and an open end 34 opposite the closed end 32. The chamber 36 extends between the ends 32, 34, preferably with a generally circular cross-section. A port 38 is formed in a side of the second leg 30 adjacent the first leg 22. This port 38 defines a location where the central bore 24 of the first leg 22 gains access to the chamber 36 of the second leg 30. This port 38 is preferably circular in cross-section, to facilitate passage of the piston 70 from the central bore 24 into the chamber 36 somewhat, as described in detail below.

With continuing reference to FIGS. 1 and 4, particular details of the slide 40 are described, according to a preferred embodiment. The slide provides a preferred form of movable piston holder. In particular, the slide 40 holds the piston 70 in its closed position until the slide 40 moves from a first position to a second position. The slide 40 is preferably a solid unitary mass of rigid material having high strength characteristics, such as an appropriate steel material or brass. The slide 40 is generally cylindrical in form except as particularly described herein. The slide 40 includes a flat preferably generally circular face 42 on an end thereof facing the closed end 32 of the second leg 30 of the housing 20. A driven end 44 is provided opposite the face 42. This driven end 44 is abutted by the spring 50 as described in detail below.

Generally, cylindrical sides of the slide 40 between the face 42 and driven end 44 are flattened at a plane 46 and a step 48, with a wall 49 joining the plane 46 to the step 48. The plane 46 is preferably a flat surface parallel with a central axis of the slide 40. The step 48 is also preferably a flat surface parallel with a central axis of the slide 40. The step 48 is closer to a central axis of the slide 40 than the plane 46. In fact, the step 48 can even be on an opposite side of a central axis of the slide 40 than a side of the slide 40 where the plane 46 is located. The wall 49 is preferably flat and perpendicular to the plane 46 and step 48.

The plane 46 is closer to the face 42 than is the step 48 and supports the piston 70 pressing against the slide 40, when the piston 70 is in its closed position. Thus, pressure from the high pressure fluid F provides a force acting linearly on the piston 70 within the central bore 24, pressing the piston 70 against the slide 40. The plane 46 of the slide 40 receives this force from the piston 70 and transfers this force to the slide 40 where this force is then supported by walls of the chamber 36 on a side of the slide 40 opposite the piston 70. Because this pressure force is perpendicular to the central axis of the slide, the pressure force is not resisted by the eutectic mass 60.

The spring 50 provides a preferred form of means to bias the slide 40 toward a second position closer to the closed end 32 of the second leg 30 than a first position closer to the open end 34 of the second leg 30. Alternative biasing means for the spring 50 could include a volume of fluid at a pressure sufficient to apply a force on the slide 40. Also, the spring 50 could be a tension spring pulling on the slide 40, rather than pushing on the slide 40 (in which case the eutectic mass 60 would be on a common side of the slide 40 with the spring 50, such as nested inside a center of the spring 50).

This spring 50 is preferably a helical compression spring with a first end 52 abutting the driven end 44 of the slide 40 and a second end 54 abutting the cap 55. The cap 55 preferably includes a central post 56 which can reside inboard of turns of the spring 50 adjacent the second end 54 to help keep the spring 50 aligned within the chamber 36 and adjacent the open end 34 of the second leg 30 of the housing 20. The spring 50 thus biases the slide 40 toward its second position closer to the closed end 32 of the second leg 30.

With continuing reference to FIGS. 1, 2 and 4, details of the eutectic mass 60 are described according to a preferred embodiment. The eutectic mass 60 is located between the closed end 32 of the second leg 30 within the chamber 36 and against the face 42 of the slide 40 opposite the driven end 44 where the spring 50 presses on the slide 40. Thus, the eutectic mass 60 keeps the slide 40 from moving from the first position to the second position under force supplied by the spring 50. The eutectic mass 60 includes a side wall 62 which is generally cylindrical in form allowing the eutectic mass 60 to reside within the chamber 36. The eutectic mass 60 includes an abutment surface 64 adapted to abut the face 42 of the slide 40 and an opposite surface 66 opposite the abutment surface 64 and adapted to abut the closed end 32 of the second leg 30 of the housing 20. The eutectic mass is preferably reusable to simplify construction.

Structurally, the eutectic mass 60 keeps the slide 40 in its first position with the piston 70 pressing against the plane 46 of the slide 40, and with the eutectic mass 60 sufficiently strong to resist compression forces supplied by the spring 50 acting on the driven end 44 of the slide 40.

The eutectic mass 60 is selected to have a threshold melting point matching a threshold temperature at which the relief device 10 is designed to transition to an open position and vent high pressure fluid F from the tank T or other compressed fluid containment structure. The eutectic mass 60 is sufficiently strong to avoid creep or other significant deformation when experiencing compression loads supplied by the spring 50. This compression load supplied by the spring 50 (along arrow A of FIG. 2) is significantly less than forces associated with the pressure of the fluid F within the tank T (applied along arrow C of FIGS. 1 and 2). Thus, the eutectic mass 60, which might not be able to resist pressure force associated with the compressed fluid F acting thereon, without creep, can resist the force applied by the spring 50 on the slide 40, and so securely keeps the slide 40 in position to keep the piston 70 in its closed position, unless the eutectic mass 60 is heated sufficiently to reach its melting point.

The melting point for the eutectic mass 60 is carefully selected to avoid creep at low pressure and to melt at a temperature matching the preselected maximum temperature for activation of the relief device 10. A temperature of 200° F. might be typical. Such a melting point can be tailored by selecting the proper material for the eutectic mass. For instance, various different alloys of tin can be formed with other elements to provide various different melting points. With some alloys, this melting point might be a transition to a soft but still solid phase. Such a transition is included within the scope of the definition of the term melting and melting point for purposes of this invention. While the eutectic material is typically formed from appropriate metals, it could alternatively be formed from a hydrocarbon material, such as a low melting temperature long chain hydrocarbon plastic material, or a paraffin or other wax material having an appropriate melting point and strength characteristics before experiencing a melting point preselected in the design of the tank T or other high pressure fluid F containing structure.

While the eutectic mass 60 is shown in this embodiment in compression due to forces exerted by the spring 50, the eutectic mass 60 could be loaded in tension. For instance, the slide 40 could be coupled to the eutectic mass 60 and the eutectic mass 60 could be coupled to the housing 20, and the spring 50 could be a tension spring rather than a compression spring, or the spring 50 could be located on the same side of the slide 40 as the eutectic mass 60.

With continuing reference to FIGS. 1, 2 and 4, details of the piston 70 are described, according to a preferred embodiment. The piston 70 is an elongate rigid structure residing within the central bore 24. The piston 70 is a preferred form of pressure responsive element interposed between the high pressure fluid on one side and the slide 40 on the other side, so that the high pressure fluid exerts a force on the pressure responsive element pushing it against the slide 40.

The piston 70 generally includes a head 72 at an end abutting the slide 40 and a shaft 74 coupled to the head 72. Preferably, the head 72 has a larger diameter than the shaft 74, the shaft 74 residing within the central bore 24 and the head 72 located beyond the central bore 24 and within a transition area between the central bore 24 of the first leg 22 and the chamber 36 of the second leg 30.

The piston 70 includes a foot 75 at an end of the shaft 74 opposite the head 72. This foot 75 is the surface against which the fluid F acts to apply a pressure force on the piston 70 tending to push the piston 70 away from the tank T or other high pressure fluid F containing structure. Adjacent the foot 75, the piston 70 also preferably includes a plurality of grooves 78 holding seals 76 therein which remain captured by the grooves 78 and translate along with the piston 70 (along arrow B of FIG. 2).

With particular reference to FIGS. 1, 2 and 4, details of the vent 80 are described according to a preferred embodiment. The vent 80 defines a pathway for relief of high pressure fluid F from the tank T out to a surrounding environment. This vent 80 is preferably located on a side of the first leg 22 of the housing 20. The vent 80 includes a manifold space 82 with a plurality of holes 84 penetrating a wall of the housing 20 between the manifold space 82 and the environment surrounding the relief device 10. High pressure fluid F can flow (along arrow D of FIG. 2) through the holes 84 in the vent 80 when the piston 70 moves to its open position (along arrow B of FIG. 2); and following movement of the slide 40 (along arrow A of FIG. 2) after melting of the eutectic mass 60 associated with the threshold temperature for the relief device 10 being exceeded. The holes 84 can lead to a safe location away from the vent 80 and other areas that might be adversely impacted by exposure to the fluid, if desired, such as through a pipe, or if acceptable, merely vented to the atmosphere at the vent 80.

In use and operation, and with particular reference to FIGS. 1 and 2, details of the performance of the relief device 10 are described according to a preferred embodiment. Initially, the relief device 10 is assembled in a manner similar to that depicted in FIG. 4, by loading the various different subassemblies of the relief device into the first leg 22 and second leg 30 of the housing 20. Once the first leg 22 of the housing 20 is threaded into the second leg 30 of the housing 20 and the cap 55 is threaded onto the second leg 30 of the housing 20, the relief device 10 is ready to be used. The eutectic mass 60 within the chamber 36 has been preselected before manufacture to have a melting point which matches a maximum design temperature for the tank T or other high pressure fluid F containing structure to which the relief device 10 is intended to be attached.

The relief device 10 is then attached to the tank T or other high pressure fluid F containing structure, such as by threading the attached end 26 of the first leg 22 of the housing 20 to a port on the tank T or other high pressure fluid F containing structure, either directly or through a manifold or junction to which other devices are also attached. The relief device 10 is then ready for use. Under normal operations, the high pressure fluid F exerts a force on the piston 70 (along arrow C of FIGS. 1 and 2). When the temperature of the relief device 10 remains acceptably low, the eutectic mass 60 remains in a solid phase.

The spring 50 exerts a force on the slide 40 pushing the slide 40 against the eutectic mass 60. Because the eutectic mass 60 remains solid, the slide 40 does not move. Thus, the piston 70 remains with the head 72 thereof abutting the plane 46 of the slide 40 and with the piston 70 in its closed position blocking the vent 80. This condition for the relief device 10 with the piston 70 in the closed position can be maintained indefinitely, without concern for environmental conditions. The relief device 10 can be inspected by removal and disassembly and inspection of interior components thereof, should such inspection be deemed necessary, on a scheduled or irregular basis.

Should the design maximum temperature for the tank T or other high pressure fluid F containing structure be exceeded, the eutectic mass 60 begins to melt. As the eutectic mass 60 melts, the slide 40 is no longer prevented from movement. Instead, the spring 50 acts on the slide 40 to move the slide 40 linearly (along arrow A of FIG. 2). Once the slide 40 has moved sufficiently far, and essentially all the way up against the closed end 32 of the second leg 30, the head 72 of the piston 70 is allowed to move from being supported by the plane 46 of the slide 40 to being supported by the step 48 of the slide 40. The piston 70 thus moves towards the slide 40 within the central bore 24.

Such movement is sufficient to cause the foot 75 of the piston 70 to move past at least a portion of the vent 80 so that high pressure fluid F can pass (along arrow D of FIG. 2) past the piston 70 and out the vent 80 into a surrounding environment. Thus, when such a high temperature is experienced by the device 10, the high pressure fluid F in the tank T is allowed to safely escape and the tank T is unable to hold fluid F at any elevated pressure until the pressure relief 10 has been replaced with a new or refurbished relief device 10. The relief device 10 thus functions as an indicator that the tank T requires thorough inspection before reuse or potential decommissioning.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A thermally activated pressure relief, comprising in combination:
   a housing having a bore therein;
   a piston located within said bore and adapted to move within said bore;
   a portion of said housing adapted to be coupled to a source of high pressure fluid with said piston acted upon by the high pressure fluid;
   a slide within said housing, said slide adapted to move between a first position and a second position within said housing in a direction non-parallel with said piston;
   said piston abutting said slide on a portion of said piston spaced from where the high pressure fluid acts upon said piston;
   said piston adapted to be pushed against said slide by fluid pressure from the high pressure fluid;
   said slide having two surfaces facing said piston, said slide surfaces spaced different distances from said piston before piston movement;
   said housing having at least one vent between said bore and a surrounding space;
   said piston having at least two positions including a closed position abutting one of said surfaces of said slide when said slide is in a first position and preventing high pressure fluid from passing through said at least one vent, and an open position abutting the other of said surfaces of said slide when said slide is in a second position and allowing high pressure fluid to pass through said vent;
   said slide biased toward said second position;
   a eutectic mass holding said slide in said first position when said eutectic mass is in a solid phase; and
   wherein said two surfaces of said slide facing said piston are oriented parallel to each other.

2. The relief of claim 1 wherein said two surfaces of said slide facing said piston are oriented perpendicular to a central axis of said piston.

3. The relief of claim 1 wherein said bore is cylindrical in form with a substantially circular cross-section, said bore extending linearly within said housing.

4. The relief of claim 3 wherein said slide is located in a chamber at an end of said bore spaced from said portion of said housing coupled to the high pressure fluid source.

5. The relief of claim 4 wherein said piston includes a shaft and a head, said head abutting said slide, said shaft blocking said vent when said slide is in said closed position, said shaft of said piston including seals thereon to seal said vent when said slide is in said closed position.

6. The relief of claim 4 wherein a spring is provided adjacent said slide, said spring biasing said slide toward said second position.

7. The relief of claim 6 wherein said eutectic mass is located on a side of said slide opposite said spring.

8. The relief of claim 7 wherein said spring has a spring constant which causes a spring force of said spring acting on said slide to be less than a force at which said eutectic mass experiences creep when in a solid phase.

9. A thermally activated pressure relief, comprising in combination:
   a housing having a bore therein;
   a piston located within said bore and adapted to move within said bore;
   a portion of said housing adapted to be coupled to a source of high pressure fluid with said piston acted upon by the high pressure fluid;
   a slide within said housing, said slide adapted to move between a first position and a second position within said housing in a direction non-parallel with said piston;
   said piston abutting said slide on a portion of said piston spaced from where the high pressure fluid acts upon said piston;
   said piston adapted to be pushed against said slide by fluid pressure from the high pressure fluid;
   said slide having two surfaces facing said piston, said slide surfaces spaced different distances from said piston before piston movement;
   said housing having at least one vent between said bore and a surrounding space;
   said piston having at least two positions including a closed position abutting one of said surfaces of said slide when said slide is in a first position and preventing high pressure fluid from passing through said at least one vent, and an open position abutting the other of said surfaces of said slide when said slide is in a second position and allowing high pressure fluid to pass through said vent;
   said slide biased toward said second position;
   a eutectic mass holding said slide in said first position when said eutectic mass is in a solid phase;
   wherein said bore is cylindrical in form with a substantially circular cross-section, said bore extending linearly within said housing;
   wherein said slide is located in a chamber at an end of said bore spaced from said portion of said housing coupled to the high pressure fluid source;
   wherein said piston includes a shaft and a head, said head abutting said slide, said shaft blocking said vent when said slide is in said closed position, said shaft of said piston including seals thereon to seal said vent when said slide is in said closed position; and
   wherein said piston is adapted to travel a distance similar to a distance between said two surfaces of said slide facing said piston, said distance traveled by said piston at least as great as a distance required to move said shaft of said piston away from blocking said vent.

10. A thermally activated high pressure fluid relief apparatus, comprising in combination:
    a housing having an interior adapted to be coupled to a high pressure fluid containing structure;
    a pressure responsive element located within said housing;
    a pressure force adapted to be applied to said pressure responsive element from a high pressure fluid within the high pressure fluid containing structure when the housing is coupled to the high pressure fluid containing structure;
    a vent path through said housing and away from the high pressure fluid containing structure when said housing is coupled to the high pressure fluid containing structure;
    said pressure responsive element having at least two positions including a closed position and an open position;
    said closed position corresponding with said pressure responsive element at least indirectly blocking flow of high pressure fluid from the high pressure fluid containing structure through said vent, when said housing is coupled to the high pressure fluid containing structure;

said open position corresponding with said pressure responsive element at least indirectly allowing flow of high pressure fluid from the high pressure fluid containing source through said vent, when said housing is coupled to the high pressure fluid containing structure;

a movable holder adapted to act on said pressure responsive element and keep said pressure responsive element in said closed position when said movable holder is in a first position and adapted to allow said pressure responsive element to move to said open position when said movable holder is in a second position;

said movable holder adapted to move from said first position to said second position when a preselected temperature threshold is exceeded;

wherein said apparatus includes a eutectic mass adjacent said movable holder and keeping said movable holder in said first position unless said eutectic mass melts, said eutectic mass having a melting point selected to match said preselected temperature threshold;

wherein said pressure responsive element includes a translating piston within said housing;

wherein a spring is interposed against said movable holder, said spring biasing said movable holder toward said second position;

wherein said movable holder includes a slide adapted to translate linearly non-parallel with said piston, with said piston abutting a side of said slide, said spring configured as a compression spring abutting a portion of said slide, with said eutectic mass abutting a side of said slide opposite said compression spring; and wherein said slide including steps on a side thereof against which said piston abuts, said steps having a different distance away from an open position of said piston, said steps allowing said piston to translate from said closed position to said open position when said slide moves from said first position to said second position.

11. The apparatus of claim 10 wherein said pressure responsive element is directly interposed between said vent and said high pressure fluid when said housing is coupled to said high pressure fluid containing structure when said pressure responsive element is in said closed position, said pressure responsive element oriented to allow access between said vent and said high pressure fluid when said pressure responsive element is in said open position.

12. The apparatus of claim 11 wherein said pressure responsive element includes a translating piston, said housing including a cylindrical bore with said piston located within said cylindrical bore and adapted to translate within said cylindrical bore, said vent including holes in a side of said cylindrical bore, said piston including a shaft with seals thereon adapted to keep high pressure fluid from leaking around said shaft to said vent, unless said piston translates to said open position, leaving an open path between said vent and said high pressure fluid when said housing is coupled to said high pressure fluid containing structure.

13. The apparatus of claim 12 wherein said piston shaft has the high pressure fluid acting directly thereon to apply said pressure force, said piston including a head opposite a portion of said shaft experiencing said pressure force, said head of said piston abutting directly against said movable holder.

14. A method for evacuation of high pressure fluid filled containers when temperatures above design maximum temperatures are experienced, the method including the steps of:

attaching a housing to the high pressure fluid filled container with a vent within the housing;

blocking the vent at least indirectly with a piston inside the housing;

loading the piston with force from the high pressure fluid filled container;

abutting the piston against a movable piston holder;

absorbing the piston load from said loading step by the housing through the movable piston holder;

biasing the movable piston holder to a second position spaced from a first position with the second position allowing the piston to move by the high pressure fluid force and unblock the vent;

interposing a eutectic mass against the movable piston holder to keep the movable piston holder in the first position unless a temperature above the eutectic mass melting temperature is reached;

selecting the eutectic mass to have a melting point matching the design maximum temperature for the high pressure fluid filled container; and configuring the movable piston holder as a slide within the housing, the slide including a spring on one side thereof biasing the slide to the second position for the movable piston holder in the form of the slide, the slide including two steps on a side thereof, the piston abutting one of the steps when the piston is in a closed position and another of the steps when the piston is in an open position, the eutectic mass located abutting the slide on a side of the slide opposite the spring, with a step on the slide closest to the eutectic mass corresponding with the closed position for the piston.

15. The method of claim 14 including the further step of locating the vent on a side of the housing with the piston leaving the vent open when the piston moves from the closed position to the open position, corresponding with movement of the movable piston holder from the first position to the second position upon melting of the eutectic mass, and action of the spring on the movable piston holder, moving the movable piston holder toward the melting eutectic mass.

* * * * *